(No Model.)
H. W. THURSTON.
COMBINED HAND TRUCK AND WEIGHING SCALES.
No. 425,271. Patented Apr. 8, 1890.
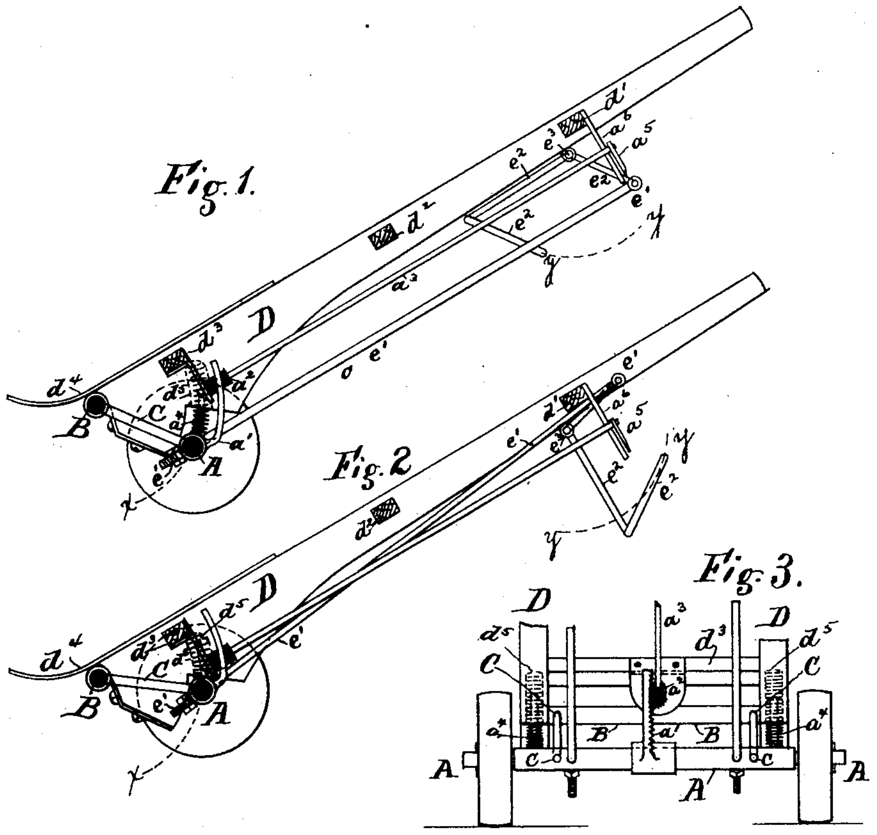
Fig. 1. Fig. 2. Fig. 3.
Fig. 4.
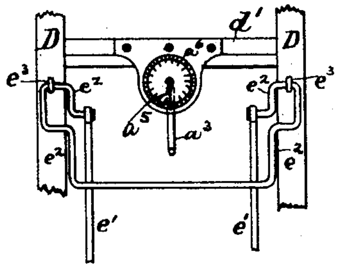
WITNESSES.
Wm. H. Weightman
Miguel A. Tona
INVENTOR:-
Henry W. Thurston
THE NORRIS PETERS CO., PHOTO-LITHO., WASHINGTON, D. C.

UNITED STATES PATENT OFFICE.

HENRY W. THURSTON, OF BROOKLYN, NEW YORK, ASSIGNOR OF ONE-HALF TO EMERY N. DOWNS, OF SAME PLACE.

COMBINED HAND-TRUCK AND WEIGHING-SCALES.

SPECIFICATION forming part of Letters Patent No. 425,271, dated April 8, 1890.

Application filed November 19, 1889. Serial No. 330,891. (No model.)

*To all whom it may concern:*

Be it known that I, HENRY W. THURSTON, a citizen of the United States, residing in Brooklyn, Kings county, and State of New York, have invented certain new and useful Improvements in Combined Hand-Truck and Weighing-Scales, of which the following is a specification, reference being had to the accompanying drawings.

My invention relates specially to that class of hand-trucks mounted on two wheels used for the movement of goods, merchandise, &c., along the docks and sidewalks.

This combined truck and weighing-scales is specially intended for shippers' use, and is only expected to indicate approximate weights sufficiently near for freight charges.

This invention consists in the application, adaptation, and combination of a weighing-scale attachment to the body of the truck in such manner that a movement of the body of the truck toward the wheel-axle indicates the weight of the load carried; also of the construction, arrangement, and combination of the several parts or portions composing the combined hand-truck and scales, as hereinafter described and claimed.

Referring to the drawings, Figure 1 represents a longitudinal section through a combined hand-truck and weighing-scales embodying my improvements. It represents the combined truck and scales at an average position or angle for weighing an ordinary load, such position or angle varying somewhat, according to size or bulk of the load weighed and carried. Fig. 2 represents a second longitudinal section showing the weighing details closed and made inoperative, and the springs constituting the weighing apparatus closed into pockets in the side timbers of the body of the truck away from the dust and dirt. Figs. 3 and 4 represent special views of the combined truck and scales, showing the operating parts and connections in position.

Similar letters of reference designate like parts or portions in all the figures.

A designates the axle and wheels, upon which the truck is moved.

B designates a fulcrum-bar, to which the truck-body and wheel-axle are attached, and upon which they both swing to approach or move away from each other.

C designates a pair of arms forming the preferred means of attaching the wheel-axle to the fulcrum-bar.

D designates the side arms of the truck-body.

$d'$, $d^2$, and $d^3$ designate cross-bars connecting the side arms together.

$d^4$ designates the lifting-shoe.

$d^5$ designates a spring-pocket formed in the side arms D as a means for holding the springs in place and for pocketing the spring when not in use.

Attached, preferably, at each end of the wheel-axle are springs $a^4$, preferably held in place upon the axle by an inner guide-pin, upon which the spring moves up and down. The action of this spring arising from its elasticity moves the truck-body and wheel-axle away from each other, and it requires a load upon the truck-body to effect the closing or shortening of the spring.

The capacity of this combined hand-truck and weighing-scale is controlled by the strength of the spring to support the load upon the truck-body. As soon as the body of the truck comes in contact with the axle, no further load can be weighed, and in proportion to the load coming upon the springs the truck-body moves toward the wheel-axle. Now, to indicate the movements of the truck-body toward the wheel-axle, and also the weight of the load applied, a gear-connection is made between the axle and truck-body, and a shaft $a^3$, to which a hand is attached, rotates in front of a dial-plate to indicate the number of pounds the load weighs. My preferred method, as here shown, is by means of rack and pinions $a'$ and $a^2$, adapted to rotate shaft $a^3$, and this shaft $a^3$ is carried along the bottom of truck-body to the immediate neighborhood of the handles. A dial $a^6$, which forms the bearing for the handle end of the shaft $a^3$, is attached to cross-bar $d'$ of the truck-body, and the indicating-hand $a^5$ is attached at the end of the shaft $a^3$, and the consequent rotation of this hand points out on the dial the weight of the load.

For the purpose of closing the weighing apparatus and rendering it inoperative when not required for use, the wheel-axle is forced up against the truck-body until the spring is completely housed within the pocket $d^5$.

To enable the operator of the truck to open or close the weighing apparatus at will, the operation is preferably effected by means of a lever $e^2$, which also acts as a leg for the truck-body to rest upon when not in use.

A special supporting-leg $e^2$ for the handle end of the weighing-truck is constructed as shown in the side views of same in Figs. 1 and 2 and front view in Fig. 4. This leg is of U shape, each of the portions being marked in Figs. 1 and 2 by letter $e^2$. It extends across the truck beneath the body in the shape as shown and marked $e^2$ in Fig. 4. It swings upon a pair of eyes or centers $e^3$, which eyes or centers are attached to the two side arms D. A pair of side rods $e'$ connect with the ends of supporting-leg $e^2$, as shown in Fig. 4, and also with wheel-axle A. Now, by moving or swinging this supporting-leg $e^2$ upon its centers or eyes $e^3$, a push or pull upon the side rods $e'$ is effected, which in turn causes the wheel-axle A to move toward or from the spring-pockets and forcing the springs to an active or inactive position within the pockets $d^5$ in the side arms D. Thus the supporting-leg $e^2$ performs two duties—namely, that of supporting the handle end of truck-body when not in use and that of effecting by leverage the opening or closing of the springs for action or inaction. When the springs are open and active, this leg-lever is in the position as marked by $e^2$ $e^2$ $e^2$ in Fig. 1, and when closed the leg-lever is in the position as marked similarly in Fig. 2.

In the operation of this combined truck and weighing scales, a load having been placed, as usual, upon the truck-body, the truck as a whole is held in position similar to that for wheeling, and in such position that the center of gravity of the load to be moved and weighed shall be in direct line with the center line of spring action, or for ordinary loads at an angle similar to that shown in Figs. 1 and 2. Pressure of the load comes in the direction of and upon the springs $a^4$, closing them more or less, according to the weight of load carried. The movement of the truck-body and wheels toward each other affects the gear movement of the indicating-shaft $a^3$, and this shaft revolving moves the hand $e^5$ to indicate the weight of the load upon the dial $e^6$.

The springs $a^4$, pockets $d^5$, gear-rack $a'$, the truck-body and wheel-axle, all are formed and connected to move upon the fulcrum-rod B as a center, following the curved line $x$. The leg-lever $e^2$ moves upon a center $e^3$, following the curved line $y$ $y$.

Two weighing-springs are preferably used, as shown—that is, one under each side arm D of the truck-body. In case of heavier loads, however, any number of springs to meet the weighing demands may be used and placed between the said wheel-axle and the truck-body, an extra heavy timber being stretched across between the side arms to take the thrust of springs and load.

What I claim as new, and desire to secure by Letters Patent, is—

1. In combination with the truck-body and wheel-axle of a hand-truck, a fulcrum-rod to which said truck-body and wheel-axle are attached, and a weighing-spring located and acting between the said truck-body and wheel-axle, substantially as and for the purposes set forth.

2. In combination with the truck-body and wheel-axle of a hand-truck, a fulcrum-rod to which said truck-body and wheel-axle are attached, one or more weighing-springs located and acting between said truck-body and wheel-axle, and means, substantially as set forth, for rendering the weighing apparatus inoperative, substantially as and for the purposes specified.

3. In combination with the truck-body and wheel-axle of a hand-truck, a fulcrum-rod to which said truck-body and wheel-axle are attached, one or more weighing-springs located and acting between said truck-body and wheel-axle, a gear-rack and pinion attached to said wheel-axle and truck-body, respectively, a shaft and pointer operated by said rack and pinion, and a weight-indicator, substantially as and for the purposes set forth.

HENRY W. THURSTON.

Witnesses:
WM. H. WEIGHTMAN,
MIGUEL A. IENA.